United States Patent [19]

Blount, Jr.

[11] Patent Number: 5,256,761

[45] Date of Patent: Oct. 26, 1993

[54] POLYESTER COATINGS CONTAINING COVALENTLY-BOUND MESOGENIC MONOMERS

[75] Inventor: William W. Blount, Jr., Kingsport, Tenn.

[73] Assignee: Eastman Kodak Company, Rochester, N.Y.

[21] Appl. No.: 951,613

[22] Filed: Sep. 28, 1992

Related U.S. Application Data

[63] Continuation-in-part of Ser. No. 763,841, Sep. 23, 1991, abandoned.

[51] Int. Cl.$^5$ ............... C08G 63/127; C08G 63/133; C08G 63/137; C08G 63/191
[52] U.S. Cl. .................................. 528/272; 528/296; 528/307; 528/308; 528/308.6; 528/308.7
[58] Field of Search ............... 528/272, 296, 307, 308, 528/308.6, 308.7

[56] References Cited

U.S. PATENT DOCUMENTS

| | | | |
|---|---|---|---|
| 3,778,410 | 12/1973 | Jackson et al. | 528/308 |
| 4,426,478 | 1/1984 | Noyes et al. | 524/361 |
| 4,565,850 | 1/1986 | Prevosek et al. | 525/425 |
| 4,782,132 | 11/1988 | Nozawa et al. | 528/194 |
| 4,818,807 | 4/1989 | Morita et al. | 528/272 |
| 4,837,284 | 6/1989 | Matzner et al. | 525/437 |
| 4,876,540 | 9/1989 | DeMartino | 528/272 |
| 4,975,522 | 12/1990 | Ratzsch et al. | 528/272 |
| 5,157,103 | 10/1992 | Kantor et al. | 528/272 |
| 5,194,569 | 3/1993 | Kim et al. | 528/272 |

FOREIGN PATENT DOCUMENTS 286444 10/1986 European Pat. Off. .
287233 10/1988 European Pat. Off. .

OTHER PUBLICATIONS

Lenz and Jin, Polymer News, 1986, 11, pp. 200–204.
P. W. Morgan, Macromolecules, Dec., 1977, 10, pp. 1381–1389.
Jackson et al., J. Polym. Sci., Polym. Chem. Ed., 1976, 12, pp. 2043–2058.
Jackson et al., Bs. Polym. J., Dec., 1980, 12, pp. 154–162.
Chen and Jones, J. Coat. Technology, Jan., 1988, 60, pp. 39–45.
Chen and Jones, J. Appl. Polym. Sci., 1988, 36, pp. 141–163.
S. P. Pappas, J. Coat. Technol., Jul., 1989, 61, pp. 51–53.
K. Maruyama, et al., Japan. Kokai 75 40,629, 1975; Chem. Abstr. 1975, 83, 133572y.
K. Maruyama, et al., Japan. Kokai 76 56,839, 1976; Chem. Abstr. 1976, 85, 110175y.
S. Nogami, et al., Japan. Kokai 76 44,130, 1976; Chem. Abstr. 1976, 85, 79835n.
S. Nogami, et al., Japan. Kokai 77 73,929, 1977; Chem. Abstr. 1978, 88, 8624u.
Dimian and Jones, "Liquid Crystalline Oligoester Diols as Thermoset Coatings Binders," Ch. 22 Cross-Linked Polymers, ACS Symposium Series 367. R. A. Dickie, et al., Eds., ACS; Washington, D.C., 1988, p. 324.
Wang and Jones, "Synthesis of Cross-Linkable Heterogenous Oligoester Diols by Direct Esterification with p-Hydroxybenzoic Acid," Ch. 23, Cross-Linked Polymers, ACS Symposium Series 367. R. A. Dickie, et al., Eds., ACS: Washington, D.C., 1988, pp. 335–348.

*Primary Examiner*—John Kight, III
*Assistant Examiner*—Jeffrey Culpeper Mullis
*Attorney, Agent, or Firm*—Bernard J. Graves, Jr.; William P. Heath, Jr.

[57] ABSTRACT

Provided is a novel curable liquid crystalline polyester and curable enamel compositions containing same. Coatings obtained from these compositions possess good thermal stability, high modulus, and improved chemical resistance.

18 Claims, No Drawings

POLYESTER COATINGS CONTAINING COVALENTLY-BOUND MESOGENIC MONOMERS

CROSS REFERENCE TO RELATED APPLICATION

This application is a continuation in part of U.S. Ser. No. 07/763,841, filed Sep. 23, 1991, now abandoned.

FIELD OF THE INVENTION

This invention belongs to the field of polymer chemistry. More particularly, this invention relates to polyester coatings containing mesogenic liquid crystal inducing monomeric residues.

BACKGROUND OF THE INVENTION

Roviello and Sierger, *J. Poly. Sci., Polym. Let. Ed.*, 13. 455 (1975), teach polymeric substances which exhibit melt anisotropic phases with optical properties appearing very similar to conventional, monomeric thermotropic liquid crystals. Others have synthesized a variety of polymers from novel monomers capable of forming liquid crystalline structures. In turn, these polymers have been evaluated to characterize the unique chemical and mechanical properties of polymer fibers, films, and molded articles fabricated from them. These unique properties have been attributed to the rigid rod-like structure of the monomers which imparts a collinear geometry to the mesogenic polymer repeating groups. Increased thermal stability, higher stiffness (modulus), and improved chemical resistance are generally obtained from the close packing of these polymer units in this stable mesophase, or liquid crystalline form.

Unless these rigid rod polymers are modified structurally, they are generally insoluble, infusible (not melt processable) and otherwise intractable. For example, poly(hydroquinone terephthalate) and poly (hydroquinone trans-1,4-cyclohexanedicarboxylate) are non-mesomorphic rigid polyesters with decomposition temperatures above 500° C. (See Aguilera and Lüderwald, *Makromol. Chem.*, 179, 2817 (1978) and Kricheldorf and Schwarz, *Makromol. Chem.*, 188, 1281-1294 (1987)). Alteration of the polymer structure by copolymerization with a non linear or "kink inducing" monomer such as isophthalic acid and/or a "flexible spacer" like 1,10-decanediol has been found to depress the melting point. (See Ghadage, *J. Appl. Poly. Sci.*, 37, 1579-1588). Further, Delvin and Ober, *Polymer Bull.*, 20, 45-51 (1988) report that the solubility of the stiff polymer so modified can be significantly improved.

Many of these liquid crystalline polymers have found commercial application as fibers, films, and plastics. The improvements which this class of polymers provide include high strength and modulus down to −195° C.; excellent oxygen and water barrier properties; non dripping; no nitrous oxides or cyanides upon burning; dimensional stability up to 200°-300° C.; coefficient of thermal expansion equal to glass; transparent to microwave radiation; humidity resistance of 200 h at 120° C. with no effect; very low moisture absorption; dielectric properties as good as high performance plastics; excellent stain resistance; low or no odor; and higher filler loading ability.

SUMMARY OF THE INVENTION

Coatings specifications for increased thermal stability, higher stiffness (modulus), and improved chemical resistance may be met by designing polymers having closely packed rigid domains obtained with liquid crystal inducing or mesogenic polymer inter mediates. It is the object of this invention to show that the composition of conventional oil free polyester coatings polymers can be modified to contain repeating units of such mesogenic monomers in the polymer backbone which provide enhanced performance properties versus coatings prepared without these monomers. A novel method for calculating the reactor charge for polyester coatings resins having desired number average molecular weights and acid values, or unreacted carboxyl (—COOH) groups is provided to enable facile staged co-polymerization with a variety of mesogenic, liquid crystal inducing monomers. This invention also discloses fully formulated, sprayable, amino-resin crosslinkable enamels prepared from the mesogen-containing polyesters.

DETAILED DESCRIPTION OF THE INVENTION

PART A

Calculation of Carboxy-Functional Polyester Coatings Resin Prepolymers

In meeting the objectives cited in this invention, it is first necessary to design a prepolymer that will serve at least three functions towards achieving a useful polyester coatings resin containing covalently bound mesogenic monomers. The prepolymer should:

1. provide a clear, homogeneous, low viscosity medium for the copolymerization of the selected mesogen forming monomers such as, for example, hydroquinone, trans-1,4-cyclohexane dicarboxylic acid, and p-hydroxybenzoic acid;

2. contain carboxylic acid functional groups capable of reacting with at least one of the mesogenic monomers which also contains at least one hydroxyl group; and 3. flexibilize or otherwise disrupt the polymer structure to the extent that solutions, dispersions or lower melting points will permit the formulation of coatings by conventional processes.

It is important but not necessary to this invention that the prepolymer will provide a balance of hardness, flexibility, weatherability, and hydrolytic stability to the coating that may not be obtainable with a coating manufactured from mesogenic monomers alone.

Molecular Weight Resin Parameters

In specifying the number average molecular weight of a coatings resin, it is useful to refer to an "F" factor as the ratio of the total moles of polyester intermediates in the reaction mixture ($M_t$) to the total equivalents of hydroxyl functionality ($E_b$) required for the reaction. The "F" factor is related to the polymer chain length by parameter "n", the number of molecules in the chain. These relationships are shown mathematically in Equation 1. The equivalent excess of carboxyl functionality is discussed below and is shown in Equation 2.

$$F = \frac{1}{1 - \frac{1}{n}} = \frac{M_t}{E_b} \qquad \text{Equation 1}$$

$$C = \frac{E_a}{E_b} \qquad \text{Equation 2}$$

The value for the "n" parameter is estimated by dividing the desired polyester number average molecular weight by the average residual molecular weight of the reactants selected. The residual molecular weight is that portion of the reactant minus condensate, usually one mole of water or methanol. Alternately, the chain length of the prepolymer can be selected and this number substituted for "n" in Equation 1 to obtain the required "F" value. The ability to formulate a polyester coatings resin to a required molecular weight is highly desirable since this affords a method of adjusting the viscosity of the resin and of the final paint formulation that is acceptable for the application method. This is because a change in molecular weight causes a corresponding change in melt and solution viscosities. The "F" factor in combination with other target values selected by the coatings chemist can be used to define a unique polyester resin. Examples of other target value parameters are excess hydroxyl content, hydroxyl value, hydroxyl equivalent weight, acid value, carboxyl equivalent weight, and molar or weight ratios of reactants.

Since the molecular weight of the prepolymer is to be increased by reaction with mesogenic monomers and the final polymer molecular weight will be considerably higher as a result of cross-linking reactions occurring during coating application, selected molecular weights or "n" values for the prepolymer that are lower (or higher) than those used in the examples would also be useful in describing this invention.

Carboxyl or Acid Excess Resin Parameters

The coatings resin prepolymers generated from, for example 2,2-dimethyl-1,3-propanediol and cis,trans-1,4-cyclohexanedicarboxylic acids are preferably formulated using the "F" factor. For those polymers which are formulated with a branch inducing monomer such as trimellitic anhydride, trimethylolpropane or trimethylolethane, it is necessary to also consider a "C" factor. The "C" factor is defined as the ratio of the total combining equivalents of acid (carboxyl), $E_a$, to the total combining equivalents of base (hydroxyl), $E_b$, (Equation 2). When equations 1 and 2 along with a weight balance equation used to account for condensate loss during the polymerization and equations relating raw material molar and weight ratios are solved simultaneously, a unique reactor charge for the desired resin is obtained. All formulations given in the Example section have been calculated using matrix algebra.

As the F value decreases, the polymer molecular weight increases. Higher C values indicate an increase in the polymer's final acid functionality, i.e., a lower equivalent weight per carboxyl group.

Acid and Base Equivalents

The term $E_b$ of this invention means the total number of equivalents of all (100 mole percent of base) of the hydroxyl, amino, or epoxy functionality. This total is obtained by multiplying the number of moles of each reactant in this grouping by its functionality, i.e., the total number of basic reactive groups per mole of reactant that are capable of reacting with an acid or ester group. Similarly, the term $E_a$ means the total number of equivalents of all (100 mole percent of acid) of the carboxylic acid, anhydride or ester functionality. This total is obtained by multiplying the number of moles of each reactant in this grouping by its functionality, i.e., the total number of acidic reactive groups per mole of reactant that are capable of reacting with a hydroxy, amino, or epoxy group.

Model

Refer to the following model (Structure 1) for the prepolymer examples which follow:

$ACID_{flex}\text{-}[GLYCOL_{flex}\text{-}ACID_{flex}]_x\text{-}[TRIOL_{flex}\text{-}(ACID_{flex})_y]_z$   Structure 1

Note that the terminus of all branches must be a carboxylic acid functional group, —COOH.

EXAMPLES-PART A

Preparation of Carboxy Functional Polyester Coatings Resin Prepolymers

Condensation polymerization reactions are carried out using well known procedures. The most preferred method is to melt all reactants for the flexible prepolymer in a suitably sized reactor, heat the reactants to initiate the reaction, and continue processing until the desired molecular weight is reached. Reaction is evidenced by the collection of water (direct condensation) or alcohol (ester interchange) and its progress measured by acid value and/or viscosity measurements. This procedure used for the prepolymer examples of this section is referred to as fusion processing and can be conducted at atmospheric pressure or under vacuum.

EXAMPLE 1

Coatings Resin Prepolymer A From 2,2-Dimethyl-1,3-Propanediol and cis-1,4-Cyclohexanedicarboxylic Acid—Structure 1, x=3, y=0, z=0

A target chain length of "n"=7 was selected for the prepolymer prepared from 2,2-dimethyl-1,3-propanediol (NPG Glycol) and cis-1,4-cyclohexanedicarboxylic acid (cis-CHDA). From Equation 1, the required "F" value is 1.167. Equation 1 and the weight balance equation (Weight of Reactants−Condensate=Product) can be solved simultaneously to give the reactor charge for Prepolymer Resin A (Table I).

An excellent reference describing the methodology for setting up and solving the simultaneous equation is "*Computer Program for Design and Formulation of Reactive Polyester Resins*", D. C. Finney, Journal of Paint Technology, Vol. 43, No. 556, May, 1971.

TABLE I

| Reactant | Prepolymer Resin A | | | |
|---|---|---|---|---|
| | Moles | Mole % | Equivalents | Charge |
| | Glycol$_{flex}$ Components | | | |
| NPG Glycol | 2.309 | 100 | 4.618 | 240.5 |
| | Acid$_{flex}$ Components | | | |
| cis-CHDA | 3.078 | 100 | 6.157 | 530.0 |

F Value = $M_t/E_b$ = 5.387/4.618 = 1.167
C Value = $E_a/E_b$ = 6.157/4.618 = 1.333
Yield (See Example 5) = 687.4
Molecular Weight = 893
Acid Value = 126
Carboxyl Equivalent Weight = 446

Polymerization was carried out in one stage. The total charge weights in grams of each reactant were placed in a one-liter, three-necked, reaction flask equipped with a stirrer, a steam-jacketed partial condenser and a glass fitting holding a nitrogen sparge tube and thermocouple wires. Because of the acid excess used for this reaction, no esterification catalyst was required. The sparge rate was 0.4 scfh and the steam pressure was regulated at 6 psig. The reaction mixture was incrementally heated to 190° C. with the temperature held for ½ hour after each 20° C. increase. Starting at a temperature of 180° C., the acid value (mg KOH per gram product) was monitored while condensate (water) was collected. The reaction was considered complete when an acid value of 126±3 mg KOH/g polymer was obtained. The product was cooled to 100° C. in preparation for the final polymerization described in Example 5 (Examples, Section B).

EXAMPLE 2

Coatings Resin Prepolymer B From 1,6-Hexanediol and cis-1,4-Cyclohexanedicarboxylic Acid—Structure 1, x=2, y=0, z=0

A target chain length of "n"=5 was selected for the prepolymer prepared from 1,6-hexanediol (1,6-HD) and cis-1,4-cyclohexanedicarboxylic acid (cis-CHDA). From Equation 1, the required "F" value is 1.250. Equation 1 and the weight balance equation (Weight of Reactants−Condensate=Product) can be solved simultaneously to give the reactor charge for Prepolymer Resin B (Table II).

TABLE II

| Reactant | Prepolymer Resin B | | | |
|---|---|---|---|---|
| | Moles | Mole % | Equivalents | Charge |
| Glycol$_{flex}$ Components | | | | |
| 1,6-HD | 1.497 | 100 | 2.994 | 176.9 |
| Acid$_{flex}$ Components | | | | |
| cis-CHDA | 2.245 | 100 | 4.491 | 386.6 |

F Value = $M_t/E_b$ = 3.742/2.994 = 1.250
C Value = $E_a/E_b$ = 4.491/2.994 = 1.500
Yield (See Example 6) = 509.6
Molecular Weight = 680
Acid Value = 165
Carboxyl Equivalent Weight = 340

Polymerization was carried out in one stage as described in Example 1. The reaction was considered complete when an acid value of 165±3 mg KOH/g polymer was obtained. The product was cooled to 100° C. in preparation for the final polymerization described in Example 6 (Examples, Section B).

EXAMPLE 3

Coatings Resin Prepolymer C From 2,2-Dimethyl-1,3-Propanediol, Isophthalic Acid and Adipic Acid—Structure 1, x=3, y=0, z=0

A target chain length of "n"=7 was selected for the prepolymer prepared from 2,2-dimethyl-1,3-propanediol (NPG Glycol), isophthalic acid (IPA) and adipic acid (AD). From Equation 1, the required "F" value is 1.167. Equation 1 and the weight balance equation (Weight of Reactants−Condensate=Product) can be solved simultaneously to give the reactor charge for Prepolymer Resin C (Table I).

TABLE III

| Reactant | Prepolymer Resin C | | | |
|---|---|---|---|---|
| | Moles | Mole % | Equivalents | Charge |
| Glycol$_{flex}$ Components | | | | |
| NPG Glycol | 1.893 | 100 | 3.785 | 197.1 |
| Acid$_{flex}$ Components | | | | |
| IPA | 1.262 | 50 | 2.524 | 209.6 |
| AD | 1.262 | 50 | 2.524 | 184.4 |

F Value = $M_t/E_b$ = 4.417/3.785 = 1.167
C Value = $E_a/E_b$ = 5.048/3.785 = 1.333
Yield (See Example 7) = 523.0
Molecular Weight = 829
Acid Value = 135
Carboxyl Equivalent Weight = 415

Polymerization was carried out in one stage as described in Example 1. The reaction was considered complete when an acid value of 135±3 mg KOH/g polymer was obtained. The product was cooled to 100° C. in preparation for the final polymerization described in Example 7 (Examples, Section B).

EXAMPLE 4

Branched Coatings Resin Prepolymer D—Structure 1, x=2, y=2, z=1

A target chain length of "n"=8 was selected for a branched prepolymer prepared from 1,1,1-trimethylolpropane (TMP), 2,2-dimethyl-1,3-propanediol (NPG), cis-1,4-cyclohexanedicarboxylic acid (cis-CHDA), isophthalic acid (IPA), and adipic acid (AD). From Equation 1, the required "F" value is 1.143. Equation 1, the weight balance equation (Weight of Reactants−Condensate=Product), and the reactant ratio equations can be solved simultaneously to give the reactor charge for Prepolymer Resin D (Table IV).

TABLE IV

| Reactant | Prepolymer Resin D | | | |
|---|---|---|---|---|
| | Moles | Mole % | Equivalents | Charge |
| Glycol$_{flex}$ Components | | | | |
| TMP | 0.400 | 33 | 1.200 | 53.7 |
| NPG | 0.800 | 67 | 1.600 | 83.4 |
| Acid$_{flex}$ Components | | | | |
| cis-CHDA | 0.800 | 40 | 1.600 | 137.8 |
| IPA | 0.400 | 20 | 0.800 | 66.5 |
| AD | 0.800 | 40 | 1.600 | 117.0 |

F Value = $M_t/E_b$ = 1.600/1.400 = 1.143
C Value = $E_a/E_b$ = 2.000/1.400 = 1.429
Yield (See Example 8) = 408.0
Molecular Weight = 1019
Acid Value = 165
Carboxyl Equivalent Weight = 340

Polymerization was carried out in two stages—each stage being processed as described in Example 1. For Stage 1 the reactor was charged with the NPG, IPA and AD of Table IV. The mixture was polymerized at a maximum temperature of 200° C. until it cleared (i.e., no evidence of solid particles in the reaction mixture) followed by an additional 1 hour's processing at 210° C. The polymer was cooled to 150° C. in preparation for Stage 2. At that temperature, the remaining reactants were charged, heated to a maximum temperature of 210° C. and processed until the acid value reached 165±3 mg KOH/g polymer. The product was cooled to 100° C. in preparation for the final polymerization described in Example 8 (Examples, Section B).

PART B

Calculation of Mesogen-Containing Polyester Coatings Resin

The prepolymers from Section A are carboxylic acid-bearing products to which can be reacted rigid rod monomers such as hydroquinone and trans 1,4-cyclohexanedicarboxylic acid to obtain the heretofore undisclosed covalently bound mesogen-containing coatings resin structure. As will be shown in the next section, these novel coatings resins can be used to formulate enamels having the desired improvements in strength, solvent resistance, humidity resistance and hardness provided by the mesogens.

As a descriptive example of a prepolymer as it relates to this part of the invention, consider poly(2,2-dimethyl-1,3-propylene-cis-1,4-cyclohexanedicarboxylate) with a chain length ("n") of 7 and an acid functionality of 2. Its composition and parameters were described in Section A, Example 1. This prepolymer was designed to function as the flexible spacer component of the model mesogen-containing coatings resin shown in Structure 2.

Structure 2

EXAMPLES—PART B

Synthesis of Covalently-Bound Mesogen-Containing Polyester Coatings Resins

The prepolymers of Examples 1–4 are cooled to 100° C. and the mesogenic intermediates added. For those mesogens having phenolic hydroxyl groups, an acidolysis (i.e., a condensation polymerization where a low boiling, low molecular weight carboxylic acid is formed) is preferred for this final polymerization step. This type of condensation will be referred to as an "acidolysis reaction." One mole of acetic anhydride per equivalent of hydroxyl is also charged with the second stage reactants to effect acetylation of all aromatic hydroxyls. Acetylation is considered complete when the reaction mixture has refluxed for one hour. Polymerization proceeds by condensation of acetic acid from the reactor by acidolysis. The reaction progress is followed by measuring the acid value and melt viscosity of the product. When target values are reached, the reactor is emptied, the polymer cooled then granulated to a handleable powder in a suitable mill.

EXAMPLE 5

Mesogen-Containing Coatings Resin AA From

Prepolymer A, Hydroquinone (HQ), and trans-1,4-Cyclohexanedicarboxylic Acid (t-CHDA)

The following materials are placed in a 2000-mL, three-necked round bottom flask fitted with a stirrer, nitrogen sparge tube (0.4 scfh), and a Barett condensate trap with total condenser.

169.3 g (1.539 mol) hydroquinone
687.4 g (0.770 mol) Prepolymer A (Example 1)
198.8 g (1.154 mol) trans-1,4-cyclohexanedicarboxylic acid
314.0 g (3.078 mol) acetic anhydride The reaction mixture is heated to reflux (about 140° C.) with the Barett trap removed and reflux maintained for one hour. The trap is then inserted between the flask and total condenser and 184.7 g (3.078 mol) acetic acid is distilled from the reaction mixture. Acidolysis is then initiated by heating the mixture from 140° C. to 230° C. over a four hour period during which time an additional 184.7 g (3.078 mol) acetic acid is recovered at a rate of about 1.5 g/min for the first hour, 1.0 g/min for the second hour, 0.4 g/min for hour 3 and the final condensate (about 10 g) collected as the polymerization is completed. During the last hour, the nitrogen sparge is increased to about 2 scfh in order to aid the diffusion of acetic acid from the viscosity-increasing product. Finally, vacuum processing (10 torr) is used to complete the acetic acid removal. The polymer is removed from the reactor, cooled, and granulated for converting into a finished coating formulation. It had a number average molecular weight of 2600, an acid Value of 43 and a F Value of 1.125. The "F" value, weight balance, and ratio equations are solved simultaneously to give the following reactor charge (Table V) for Resin AA:

TABLE V

| Reactant | Coatings Resin AA | | | |
| --- | --- | --- | --- | --- |
| | Moles | Mole % | Equivalents | Charge |
| Hydroxy-Bearing Components | | | | |
| HQ | 1.539 | 100 | 3.078 | 169.3 |
| Acid-Bearing Components | | | | |
| Prepolymer A | 0.770 | 40 | 1.540 | 687.4 |
| t-CHDA | 1.154 | 60 | 2.308 | 198.8 |
| Acetic Anhydride | 3.078 | —[a] | — | 314.0 |

F Value = $M_t/E_b$ = 3.463/3.078 = 1.125
C Value = $E_a/E_b$ = 3.848/3.078 = 1.250
Yield = 1000
Molecular Weight = 2600
Acid Value = 43
Carboxyl Equivalent Weight = 1300

EXAMPLE 6

Mesogen-Containing Coatings Resin BB From Prepolymer B, Hydroquinone, and trans-1,4-Cyclohexanedicarboxylic Acid Another useful coating resin which contains a higher mesogen level can be synthesized from Prepolymer B. Prepolymer B was reacted with trans-1,4-cyclohexanedicarboxylic acid (t-CHDA) and hydroquinone diacetate. Hydroquinone diacetate was prepared in situ by reacting hydroquinone with acetic anhydride with the amounts shown in Table VI. The target polymer was designed using the model of Structure 2 where x, y, and z are 1, 2 and 2 respectively. From this model, the value of "n" is 13, the "F" value is 1.083 (Equation 1), and the selected ratio of Prepolymer B to trans 1,4-cyclohexane dicarboxylic is 2:5. The "F" value, weight balance, and ratio equations are solved simultaneously to give the following reactor charge (Table VI) for Resin BB

TABLE VI

| Reactant | Coatings Resin BB | | | |
| --- | --- | --- | --- | --- |
| | Moles | Mole % | Equivalents | Charge |
| Hydroxy-Bearing Components | | | | |
| HQ | 2.255 | 100 | 4.510 | 248.1 |
| Acid-Bearing Components | | | | |
| Prepolymer B | 0.752 | 28.6 | 1.503 | 509.6 |
| t-CHDA | 1.879 | 71.4 | 3.758 | 323.6 |
| Acetic Anhydride | 4.510 | —[a] | — | 460.0 |

F Value = $M_t/E_b$ = 4.886/4.510 = 1.083
C Value = $E_a/E_b$ = 5.261/4.510 = 1.167
Yield = 1000
Molecular Weight = 2660
Acid Value = 42
Carboxyl Equivalent Weight = 1330
[a]Acetic anhydride is converted to acetic acid and is quantitatively distilled from the reactor.

EXAMPLE 7

Mesogen-Containing Coatings Resin CC From Prepolymer C, Mono-Chlorohydroquinone, and trans-1,4-Cyclohexanedicarboxylic Acid A third coatings resin containing high mesogen and flexible prepolymer levels is shown in this example. Increased flexibility is obtained rom Prepolymer C of Example 3 with the use of adipic acid. Prepolymer C was reacted with trans-1,4-cyclohexanedicarboxylic acid (t-CHDA) and mono-chlorohydroquinone diacetate (ClHQ). Mono-chlorohydroquinone diacetate was prepared in situ by reacting mono chlorohydroquinone with acetic anhydride with the amounts shown in Table VII. The target polymer was designed using the model of Structure 2 where x, y, and z are 1, 2 and 2 respectively. From this model, the value of "n" is 13, the "F" value is 1.083 (Equation 1), and the selected ratio of Prepolymer C to trans-1,4-cyclohexanedicarboxylic is 2:5. The "F" value, weight balance, and ratio equations are solved simultaneously to give the following reactor charge (Table VII) for Resin CC.

TABLE VII

| Reactant | Coatings Resin CC | | | |
|---|---|---|---|---|
| | Moles | Mole % | Equivalents | Charge |
| Hydroxy-Bearing Components | | | | |
| ClHQ | 1.893 | 100 | 3.786 | 273.5 |
| Acid-Bearing Components | | | | |
| Prepolymer C | 0.631 | 28.6 | 1.262 | 523.0 |
| t-CHDA | 1.577 | 71.4 | 3.155 | 271.6 |
| Acetic Anhydride | 3.786 | —[a] | — | 386.2 |

F Value = $M_t/E_b$ = 4.101/3.786 = 1.083
C Value = $E_a/E_b$ = 4.417/3.786 = 1.167
Yield = 1000
Molecular Weight = 3150
Acid Value = 35
Carboxyl Equivalent Weight = 1580
[a]Acetic anhydride is converted to acetic acid and is quantitatively distilled from the reactor.

EXAMPLE 8

Branched Mesogen-Containing Coatings Resin DD From Prepolymer D, Hydroquinone, and trans-1,4-Cyclohexanedicarboxylic Acid Prepolymer D was reacted with trans-1,4-cyclohexanedicarboxylic acid (t-CHDA) and hydroquinone diacetate. This example demonstrates that increased functionality can be built into the mesogen-containing coatings structure by first preparing a branched prepolymer flexible segment the condensing it with rigid-rod monomers as illustrated in Example 1-3. The target polymer was designed using the model of Structure 2 where x, y, and z are 1, 1 and 2 respectively. From this model, the value of "n" is 9, the "F" value is 1.125 (Equation 1), and the selected ratio of Prepolymer D to trans-1,4-cyclohexanedicarboxylic is 2:3. the "F" value, weight balance, and ratio equations are solved simultaneously to give the following reactor charge (Table V) for Resin DD:

TABLE VIII

| Reactant | Coatings Resin DD | | | |
|---|---|---|---|---|
| | Moles | Mole % | Equivalents | Charge |
| Hydroxy-Bearing Components | | | | |
| HQ | 1.539 | 100 | 3.078 | 169.3 |
| Acid-Bearing Components | | | | |
| Prepolymer A | 0.770 | 40 | 1.540 | 687.4 |
| t-CHDA | 1.154 | 60 | 2.308 | 198.8 |
| Acetic Anhydride | 3.078 | —[a] | — | 314.0 |

F Value = $M_t/E_b$ = 3.463/3.078 = 1.125
C Value = $E_a/E_b$ = 3.848/3.078 = 1.250
Yield = 1000
Molecular Weight = 2600
Acid Value = 43
Carboxyl Equivalent Weight = 1300
[a]Acetic anhydride is converted to acetic acid and is quantitatively distilled from the reactor.

PART C

Preparation of Resins and Enamel Coatings from Mesogen-Containing Polyester Coatings Resins The resins described in Examples 5-8 can be dissolved or dispersed in a paint solvent, usually xylene, and formulated into an industrial baking enamel. To the resin solution are added a cross linking resin (for example, hexamethoxymethylmelamine), pigments (rutile titanium dioxide), silicone or fluorocarbon flow control additives, acid catalysts, dispersing aids, additional solvents and other materials commonly used by the coatings industry in the manufacture of paints. No modifications in paint formulation procedures that are normally used in the manufacture of coatings are required when the covalently bound mesogens are reacted into the coatings resin as described in this invention report.

Upon applying the formulated coatings to a metal substrate such as zinc phosphate pretreated cold roll steel sheeting, the advantages of incorporating liquid crystal inducing mesogenic monomers in the coating system are realized. Compared to a control system representing the most common, state-of-the-art, industrial polyester baking enamel, these new and heretofore undisclosed coatings have significantly improved hardness, humidity resistance and toughness, and solvent resistance. The coatings have a smooth to "satin-like" texture and resist chalking on exposure to UV radiation better than the control.

The coatings test procedures followed in presenting the examples and results of this invention are standard to the industry and are as follows:
1. Acid Value of resins (ASTM Method D 465)
2. Testing Coated Metal Specimens at 100 Percent Relative Humidity—Cleveland Humidity (ASTM Method D 2247)
3. 1000 Hr. Atlas XWR Carbon arc Weather Ometer Accelerated Exposure
4. Molecular Weight (Gel Permeation Chromatography)
5. Film Thickness (General Electric Gage, Type B)
6. Film Hardness (Pencil Method)
7. Solvent resistance (Methylethyl ketone (MEK) dynamic rub test (see ASTM Method D 1308)
8. Specular Gloss (ASTM Method D 523)
9. Hegman Fineness of Dispersion (ASTM Method D 1210)

PART D

Performance Properties of Crosslinked Mesogen-Containing Polyester Coatings

The following procedure was used to prepare cross linkable enamels from the mesogen containing polymers described above.

To a quantity of the solid polymer was added enough xylene to prepare a 30 percent-by-weight dispersion. Using a high speed bladed device such as a WARING TM Blender or HENSCHEL Mixer, the polymer was dispersed in the solvent until a grind fineness value of 8 was obtained on the Hegman Fineness-of-Dispersion gauge. For white pigmented enamels, a quantity of the resin dispersion was mixed with rutile titanium dioxide to give, for example, a 55/45 resin/pigment ratio. This mixture was again dispersed in the same device until a grind fineness of 7-8 was obtained. Now, using low shear mixing, cross-linking resins and other paint additives as per the following examples were incorporated.

EXAMPLES 9–12

Pigmented Enamels Prepared From Mesogen-Containing Polymers

To 30 grams of Polymer AA of Example 5 were added 70 grams of xylene. This mixture was dispersed using a WARING Blender and 40 grams of DuPont's TITANOX (TM) R-900 titanium dioxide pigment added. After the second dispersion the Hegman fineness of grind value was 7. American Cyanamid's CYMEL ® 303 crosslinking resin (10 grams), 3M Company's Fluorad FC 430 (0.04 gram) and p-toluenesulfonic acid (0.26 gram) were blended into the white dispersion. Similar enamels were prepared from Resins BB, CC, and DD of Examples 6–8. Each enamel was spray applied to zinc phosphate pre treated 28 gauge metal test panels, allowed to flash-dry for 10 minutes, and baked in a forced air oven for 30 minutes at 160° C. The cured film thickness was 1.0–1.2 mils.

EXAMPLE 13

Control or Non-Mesogen-Containing Coatings Resin

The following materials are placed in a 2000-mL, three necked round bottom flask fitted with a stirrer, nitrogen sparge tube (0.4 scfh), a packed (¼" steel-mesh) partial condenser, a Barett condensate trap and a total condenser:

423.7 g (4.067 mol) 2,2-dimethyl-1,3-propanediol
81.7 g (0.609 mol) 1,1,1-trimethylolpropane
342.0 g (2.058 mol) isophthalic acid
300.8 q (2.058 mol) adipic acid
1.0 g (catalyst) butyl stannoic acid The flask and contents are heated to melt the diol and permit the slurry to be stirred. This requires about 45 minutes and a final temperature of 140° C. With stirring the temperature is ramped up at 0.5° C./min to 200° C. during which time 120 of the required 148 grams of by-product water is collected in the Barett trap. Heating is increased to 230° C. over the next 4 hours to complete the polymerization. After cooling to 140° C. enough xylene solvent is added to prepare a 70% solids solution which is used directly for preparing the control coatings formulation. The neat, or solvent-free product has a number average molecular weight of 2400, an acid value of 6, a hydroxyl value of 80. This combination of reactants was selected because it represents the state-of-the-art for oil-free, or industrial baking enamels based on polyester polymers which are mesogen free. Resin synthesis and enamel preparation have been fully reported in the technical literature.

Table 9 gives the results of the coatings tests performed. These data demonstrate the usefulness of incorporating rigid-rod monomers into coatings systems by demonstrating the claimed improvements in hardness, humidity resistance and solvent resistance versus non-mesogenic systems. The coatings have a low gloss yet smooth, satin-like appearance and resist chalking on exposure to UV radiation better than the control.

TABLE 9

| | | Evaluation of Coatings Derived From Mesogen-Containing Polyester Polymers | | | | | |
|---|---|---|---|---|---|---|---|
| Polymer Ref | Enamel Ref | Hardness | MEK Rubs | 60° Gloss | 1000 Hr/104° C. Humidity Resistance | XWR - % Gloss Retain | XWR Δb Yellow Factor |
| AA | 9 | 3H | 250 | 50 | No Blisters | 98 | +2.2 |
| BB | 10 | H | 250 | 55 | No Blisters | 90 | +2.8 |
| CC | 11 | 2H | 250 | 48 | No Blisters | 92 | +3.0 |
| DD | 12 | 4H | 250 | 60 | No Blisters | 95 | +2.7 |
| Control | 13 | F | 100 | 95 | Many Blist. | 78 | +4.5 |

The present invention provides linear or hydroxy-branched oligomers or "flexible prepolymers" having the Formula (1):

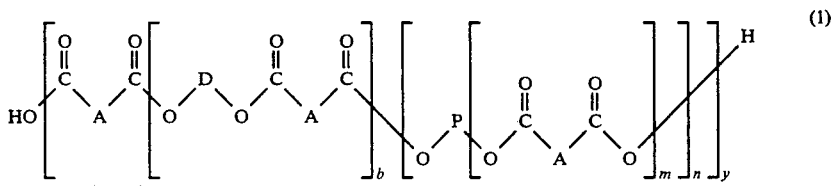

wherein
A is the residue of a dicarboxylic acid;
D is the residue of a diol;
P is the residue of a branch-inducing poly(hydroxyl group)-containing reactant;
b is 1 to about 6;
m is equal to one less than the number of hydroxyl groups present on reactant P and is greater than or equal to 2;
n is 0 to 3;
and wherein the number average molecular weight is about 300 to about 3000 which defines the value of y.

In Formula (1), above, dicarboxylic acid residues are preferably chosen from a list consisting of residues of cis-1,4-cyclohexylenedicarboxylate; trans-1,4-cyclohexylenedicarboxylate; 1,2-phenylenedicarboxylate; 1,3-phenylenedicarboxylate; 1,4-phenylenedicarboxylate; trimethylenedicarboxylate; tetramethylenedicarboxylate; pentamethylenedicarboxylate; hexamethylenedicarboxylate; and the like, or a mixture thereof.

In Formula (1) diol residues are preferably chosen from residues of 2,2-dimethyl-1,3-propanediol; 2-methyl-1,3-propanediol; 1,2-propanediol; 1,3-propanediol; 1,6-hexanediol; 2,2,4,4-tetramethyl-1,3-cyclobutanediol; 1,4-cyclohexanedimethanol; 2,2,4-trimethyl-1,3-pentanediol; 2,2-dimethyl-3-hydroxypropyl-2,2-dimethyl-3-hydroxypropionate; and the like, or a mixture thereof.

The optional branch inducing poly(hydroxyl group)-containing reactant (P) is preferably selected from 1,1,1-trimethylolpropane; 1,1,1-trimethylolethane; pentaerythritol; d,1-threitol; meso-erythritol; and the like, or a mixture thereof.

Preferably b has an average value of between about 2 and 3. Preferably m is 2 or 3. Preferably, n has an average value of about 1 to 2. Further, it is preferred that 1 and n are selected such that the molar amount of D relative to P is from about 100 mole percent D to not less than about 50 mole percent D.

The most highly preferred number average molecular weight for compounds of Formula (1) is about 1000.

As a further aspect of the present invention, there are provided carboxy-branched oligomers, or "flexible prepolymers" having Formula (2):

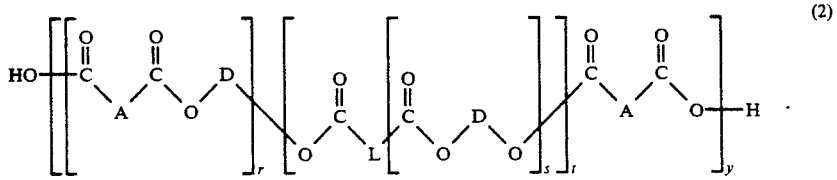

wherein
A is the residue of a dicarboxylic acid;
D is the residue of a diol;
L is a residue of a branch-inducing poly(carboxyl group)-containing reactant;
r has an average value of about 1 to about 6;
s is equal to one less than the number of hydroxy groups present on reactant (P) and is greater than or equal to 2;
t has an average value of about 0 to 3; and
the number average molecular weight is about 300 to about 3000 which defines the value of y.

In Formula (2) A and D are preferably as described above for Formula (2).

In the flexibilizing prepolymer of Formula (2) above, branching is induced if desired, by using a polycarboxylic acid co-reactant. The optional branch-inducing poly(carboxyl group)-containing reactant is preferably selected from residues of trimellitic anhydride; pyromellitic dianhydride; 1,3,5-benzenetricarboxylic acid; and the like; or a mixture thereof.

In the Formula (2), r is preferably 2 to 3; s is preferably 2 to 3; t is preferably about 1 to 2; and r and t are preferably selected such that the molar amount of A relative to L is from about 100 mole percent A to not less than 50 mole percent of A.

For flexible oligomers of Formula (1) or flexible oligomers of Formula (2), the preferred number average molecular weight is about 700.

The structures of Formulae (1) and (2) depict idealized polymer sequencing. In fact, prepolymers are prepared by a random copolymerization of reactants using the molar amounts calculated from preselected values of b, m, n, r, s and t. These values can be used to calculate the total number of moles of reactants required as well as the total equivalents of hydroxyl-bearing groups in the reaction mixture. The ratio of these two values yields an F factor which is quite useful for describing prepolymers claimed in this invention (see Tables 1 and 2). Values of F for the prepolymers above 1.50 (Mn too low) and below 1.04 (Mn too high) are not particularly useful for this invention. Preferably y is from about 1 to about 4 in formulae 1, 2 and 3 herein, most preferably from 2 to 4.

TABLE 1

| Hydroxy Branched Polymer - Ref: FIG. 1 | | | | | |
|---|---|---|---|---|---|
| b | m | n | Total Moles | Total EQOH | F Value |
| 1 | 0 | 0 | 3 | 2 | 1.50 |
| 3 | 0 | 0 | 7 | 6 | 1.17 |
| 2 | 2 | 1 | 8 | 7 | 1.14 |
| 6 | 3 | 3 | 25 | 24 | 1.04 |

TABLE 2

| Carboxy Branched Polymer - Ref: FIG. 2 | | | | | |
|---|---|---|---|---|---|
| r | s | t | Total Moles | Total EQOH | F Value |
| 2 | 0 | 0 | 3 | 2 | 1.50 |
| 3 | 0 | 0 | 7 | 6 | 1.17 |
| 2 | 2 | 1 | 9 | 8 | 1.13 |
| 6 | 2 | 3 | 25 | 24 | 1.04 |

The carboxyl terminated polyester prepolymer identified herein as [FLEX] (i.e., Formula (1) and/or (2)) can be extended by direct condensation, acidolysis, or esterolysis polymerization with liquid crystal-inducing monomers to build rigid, or mesogenic segments into the coatings polyester. The product is a [FLEX]-containing polyester coatings material with covalently bound mesogenic units and has the structure shown in Formula (3):

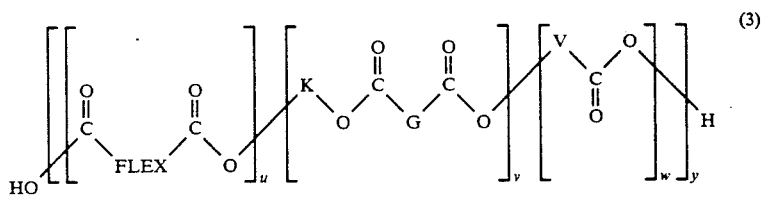

wherein
FLEX is an oligomer of Formula (1), and/or (2), above;
u is about 1 to 6;
K is the residue of a mesogenic diol or its acyl ester;
G is the residue of a mesogenic diacid;
v is about 1 to 6; and
V is the residue of a mesogenic monomer containing one hydroxyl group or its acyl ester.
w is about 0 to 4; and
wherein the number average molecular weight is about 600 to 6000 which defines the value of y.

The structure of Formula (3) depicts idealized polymer sequencing. In fact the polymer is prepared by a random copolymerization of [FLEX] with the mesogenic reactants using the molar amounts calculated from preselected values of u and v. These values can be used to calculate the total number of moles of reactants required as well as the total equivalents of hydroxyl-bearing groups in the reaction mixture. The ratio of these two values yields an F factor which is quite useful for describing the polymers claimed in this invention (see Table 3). Values of F for the final covalently bound mesogen containing polymers above 1.50 (Mn too low) and below 1.04 (Mn too high) are not particularly useful for this invention.

In Formula (3) above, u is preferably about 1 to about 3; v is preferably about 1 to 4.

The residues of mesogenic diols (K) are preferably chosen from residues of hydroquinone; hydroquinone diacetate; toluhydroquinone; mono-chlorohydroquinone; mono-tert-butylhydroquinone; mono-chlorohydroquinone dipropionate; phenylhydroquinone; and the like, or a mixture thereof.

The residues of mesogenic diacids (G) are preferably chosen from residues of trans-1,4-cyclohexanedicarboxylic acid; terephthalic acid; methylterephthalic acid; phenylterephthalic acid; 2,6-naphthalenedicarboxylic acid; and the like, or mixtures thereof.

In Formula (3) V is a mesogenic monomer containing one hydroxyl group or its acyl ester, preferably selected from residues of p-hydroxybenzoic acid; p-acetoxybenzoic acid; methyl p-hydroxybenzoate; 2-hydroxy-4-carboxynaphthalene; 2-hydroxy-6-carbomethoxynaphthalene; and the like, or mixtures thereof.

TABLE 3

| | | | Final Polymer - Ref: FIG. 3 | | |
| u | v | w | Total Moles | Total EQOH | F Value |
| --- | --- | --- | --- | --- | --- |
| 1 | 1 | 0 | 5 | 4 | 1.25 |
| 2 | 3 | 0 | 11 | 10 | 1.10 |
| 1 | 0 | 1 | 4 | 3 | 1.33 |
| 1 | 2 | 1 | 8 | 7 | 1.14 |
| 2 | 3 | 2 | 13 | 12 | 1.08 |
| 6 | 4 | 4 | 25 | 24 | 1.04 |

Thus, as a further aspect of the present invention, there is provided a curable polyester comprising repeating units of residues of Formula (3).

As a further aspect of the present invention, there is provided a thermosetting coating composition which comprises (A) about 15 to about 45 weight percent, based on the weight of the total composition, of a curable polyester comprising repeating units of residues of Formula (3);

(B) about 0 to about 85 weight percent, based on the weight of the total composition, of a solvent; and (C) about 1 to about 40 weight percent, based on the weight of (A), of a cross-linking agent.

It is preferred that (A) is present in a range of about 20 to 40 weight percent, most preferably about 25 to 35 weight percent.

Preferred amounts of (B) are about 20 to about 60 percent; more preferred are about 20 to about 40 percent. Preferred amounts of (C) are about 5 to about 40 percent; more preferred are about 20 to about 40 percent, and most preferred are about 25 to about 35 percent.

As appreciated in the art, the exact components and properties of components desired for any given coating application can vary, and therefore, routine experimentation may be required to determine the optional components and proportions of components for a given application and desired properties.

Suitable solvents for the curable enamel composition include ketones, e.g. methyl amyl ketone; glycol ethers such as 2-butoxyethanol; glycol ether esters such as ethyl-3-ethoxypropionate and methoxy propyl acetate; toluene; ester solvents such as ethyl acetate, butyl acetate, propyl acetate, and the like; alcohols such as butanol; ethoxy ethyl propionate (EEP); xylenes; and other volatile inert solvents typically used in industrial baking (i.e., thermosetting) enamels.

The cross-linking agent, component (C), above, is preferably a melamine-type cross-linking agent, i.e., a cross-linking agent having a plurality of $-N(CH_2OR)_2$ functional groups, wherein R is $C_1-C_4$ alkyl, preferably methyl.

In general, the cross-linking agent may be selected from compounds of the following formulae, wherein R is independently $C_1-C_4$ alkyl:

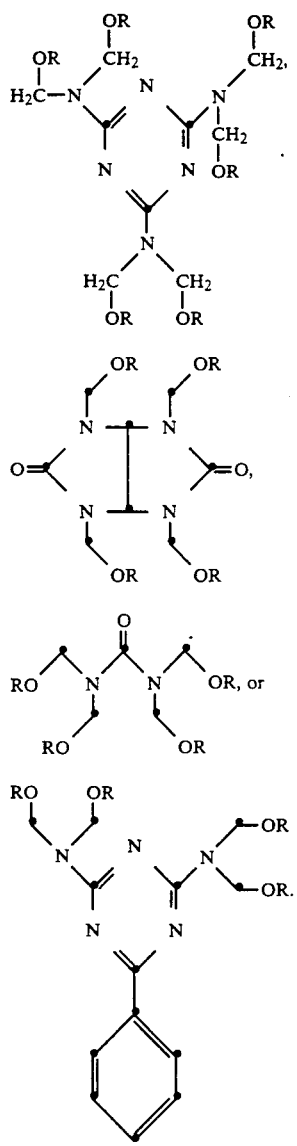

In this regard, preferred cross-linking agents include hexamethoxymethylmelamine, tetramethoxymethylbenzoguanamine, tetramethoxymethylurea, mixed butoxy/methoxy substituted melamines, and the like.

The most preferred cross-linking agent is hexamethoxymethylmelamine.

Further cross-linking agents include the blocked polyisocyanates.

The blocked polyisocyanate compounds of the compositions of this invention are known compounds and can be obtained from commercial sources or may be prepared according to published procedures. Upon being heated to cure coatings of the compositions, the compounds become unblocked and the isocyanate groups react with hydroxy groups present on the amorphous polyester to cross-link the polymer chains and thus cure the compositions to form tough coatings. Examples of the blocked polyisocyanate cross-linking component include those which are based on isophorone diisocyanate blocked with ε-caprolactam, commercially available as Hüls 1530 and Cargill 2400, or toluene 2,4-diisocyanate blocked with ε-caprolactam, commercially available as Cargill 2450, and phenol blocked hexamethylene diisocyanate.

The most readily-available, and thus the preferred, blocked polyisocyanate cross-linking agents or compounds are those commonly referred to as ε-caprolactam-blocked isophorone diisocyanate, e.g., those described in U.S. Pat. Nos. 3,822,240, 4,150,211 and 4,212,962, incorporated herein by reference. However, the products marketed as ε-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam blocked, difunctional, monomeric isophorone diisocyanate and the ε-caprolactam-blocked, trifunctional trimer of isophorone diisocyanate. The description herein of the cross-linking agents as "polyisocyanates" refers to compounds which contain at least two isocyanato groups which are blocked with, i.e., reacted with, another compound, e.g., ε-caprolactam. The reaction of the isocyanato groups with the blocking compound is reversible at elevated temperatures, e.g., normally about 150° C. and above, at which temperature the isocyanato groups are available to react with the hydroxyl groups present on the free hydroxy groups of the polyester to form urethane linkages. Alternatively, the blocked isocyanate may be a cross-linking effective amount of an adduct of the 1,3-diazetidine-2,4-dione dimer of isophorone diisocyanate and a diol having the structure

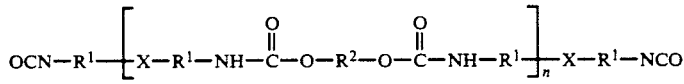

wherein
R¹ is a divalent 1-methylene-1,3,3-trimethyl-5-cyclohexyl radical, i.e., a radical having the structure

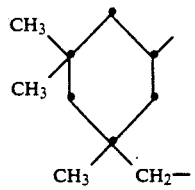

R² is a divalent aliphatic, cycloaliphatic, araliphatic or aromatic residue of a diol; and X is a 1,3-diazetidine-2,4-dionediyl radical, i.e., a radical having the structure

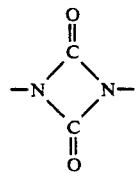

wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° to 130° C.

The adducts of the 1,3-diazetidine-2,4-dione dimer of isophorone diisocyanate and a diol are prepared according to the procedures described in U.S. Pat. No. 4,413,079, incorporated herein by reference, by reacting the diazetidine dimer of isophorone diisocyanate, preferably free of isocyanurate trimers of isophorone diisocyanate, with diols in a ratio of reactants which gives as isocyanato:hydroxyl ratio of about 1:0.5 to 1:0.9, preferably 1:0.6 to 1:0.8. The adduct preferably has a molecular weight of 1450 to 2800 and a melting point of about 85° to 120° C. The preferred diol reactant is 1,4-butanediol. Such an adduct is commercially available under the name Hüls BF1540.

The amount of the blocked diisocyanate cross-linking compound present in the compositions of this invention can be varied depending on several factors such as those mentioned hereinabove relative to the amount of components (I) and (II) which are utilized. Typically, the amount of cross-linking compound which will effectively cross-link the polymers to produce coatings having a good combination of properties is in the range of about 5 to 30 weight percent, preferably 15 to 25 weight percent, based on the total weight of components (I) and (II).

Further cross-linking agents include the epoxy resins.

Preferred epoxy functional resins generally have a molecular weight of about 300 to about 4000, and have approximately 0.05 to about 0.99, epoxy groups per 100 g of resin (i.e., 100–2000 weight per epoxy (WPE)). Such resins are widely known and are commercially available under the EPON ® tradename of the Shell Chemical Company, the ARALDITE ® tradename of Ciba-Geigy, and D.E.R. resins of the Dow Chemical Company.

Further cross-linking agents include the polymeric isocyanates, for example, Mobay's DESMODUR N-75.

The coating composition optionally contains up to about 70 weight percent based on the weight of polyester of one or more additional coating additives.

As a further aspect of the present invention there is provided a cross-linkable enamel composition as described above, further comprising one or more leveling, rheology, and flow control agents such as silicones, fluorocarbons or cellulosics; flatting agents; coalescing agents such as diethylene glycol monobutyl ether, trimethylpentanediol monoisobutyrate, or ethylene glycol monooctyl ether; pigment wetting and dispersing agents and surfactants; ultraviolet (UV) absorbers; UV light stabilizers; tinting pigments; defoaming and antifoaming agents; anti-settling, anti-sag and bodying agents; thickeners such as carboxymethyl cellulose, hydroxypropyl methyl cellulose, ethyl hydroxyethyl cellulose, guar gum and the like; anti-skinning agents; anti-flooding and anti-floating agents; fungicides and mildewicides; corrosion inhibitors; thickening agents; or coalescing agents.

Specific examples of such additives can be found in *Raw Materials Index*, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the tradename SYLOID®; polypropylene, available from Hercules Inc., under the tradename HERCOFLAT®; synthetic silicate, available from J. M. Huber Corporation under the tradename ZEOLEX®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetra sodium N-(1,2-dicarboxy-ethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine sast of an unsaturated fatty acid, all available from BYK Chemie U.S.A. under the tradename ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the tradename BRUBREAK of Buckman Laboratories Inc., under the BYK® tradename of BYK Chemie, U.S.A., under the FOAMASTER® and NOPCO® tradenames of Henkel Corp./Coating Chemicals, under the DREW-PLUS® tradename of the Drew Industrial Division of Ashland Chemical Company, under the TROYSOL® and TROYKYD® tradenames of Troy Chemical Corporation, and under the SAG® tradename of Union Carbide Corporation.

Examples of fungicides, mildewicides, and biocides include 4,4-dimethyloxazolidine, 3,4,4-trimethyloxazolidine, midified barium metaborate, potassium-N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the tradename CYASORB UV, and diethyl 3-acetyl-4-hydroxy-benzyl-phonsphonate, 4-dodecyloxy-2-hydroxy benzophenone, and resorcinol monobenzoate.

It may also be desirable to include such a composition one or more conventional crosslinking catalysts such as p-toluenesulfonic acid or dodecyl-benzene sulfonic acid.

A preferred amount of such coating additives is about 1 to about 30 percent.

The Gardner-Holdt viscosity of the coating composition is preferably about T to about Z3; more preferred is about W to about Z1. These viscosity values permit application by spraying and/or wire-rod drawdowns as practiced in Examples 9–13 of the application.

The coating composition can be prepared by the techniques described herein and/or by techniques known in the art, e.g., as disclosed in U.S. Pat. Nos. 4,698,391, 4,737,551, and 3,345,313; the disclosures of which are incorporated herein by reference.

The coating composition can be coated into a substrate and crosslinked ūsing techniques known in the art; e.g., by spray-applying 3 to 4 mils of wet coating and baking in a 150° C. forced air oven for 30 minutes.

The substrate can be any common substrate such as paper, polyester films such as polyethylene or polypropylene, metals such as aluminum or steel glass; urethane elastomers, primed (painted) substrates; and the like.

The coating composition is preferably a paint such as a clear or pigmented enamel, a lacquer, an ink or a varnish.

After the coating composition is coated onto a substrate and cured (i.e., cross-linked) such cured coating has many desirable properties such as good pencil hardness, good gloss, good humidity resistance, and good methyl ethyl ketone (MEK) double rub solvent resistance.

Preferred pencil hardness (mar/cut) is about B to about 4H; more preferred is at least F; preferred gloss at 60° to about 40% to about 100%, more preferred is about 60%; preferred MEK double rub resistance at least is about 200, preferred is at least about 250; preferred humidity resistance (100 hours at 60° C.) is about 88-100% gloss retention and most preferred is additionally without blister formation; a preferred change in yellow factor is less than +4.0 units, and preferred is no more than 3.0 units.

I claim:

1. A curable polyester of Formula (3)

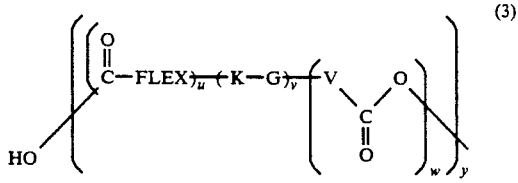

wherein

FLEX is the residue of an oligomer of Formula (1) or (2):

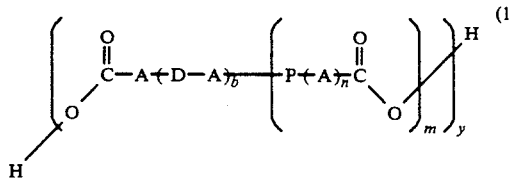

wherein

A is the residue of a dicarboxylic acid selected from the group consisting of residues of cis-1,4-cyclohexylenedi-carboxylate; cis-1,3-cyclohexylenedicarboxylate; trans-1,4-cyclohexylenedicarboxylate; 1,2-phenylenedicarboxylate; 1,3-phenylenedicarboxylate; 1,4-phenylenedicarboxylate; trimethylenedicar-boxylate; tetramethylenedicarboxylate; penta-methylenedicarboxylate; and hexamethylenedicar-boxylate;

D is the residue of a diol selected from the group consisting of residues of 2,2-dimethyl-1,3-propanediol; 2-methyl-1,3-propanediol; 1,2-propanediol; 1,3-propanediol; 1,6-hexandediol; 2,2,4,4-tetramethyl-1,3-cyclobutanediol; 1,4-cyclohexanedimethanol; 2,2,4-trimethyl-1,3-pentanediol; and 2,2-dimethyl-3-hydroxypropyl-2,2-dimethyl-3-hydroxypropionate;

P is the residue of a branch-inducing poly(hydroxyl group)-containing reactant;

b is 1 to about 6;

m is equal to one less than the number of hydroxyl groups present on reactant P and is greater than or equal to 2;

n is 0 to 3;

and wherein the number average molecular weight of the residue of Formula (1) is about 300 to about 3000 which defines y; or

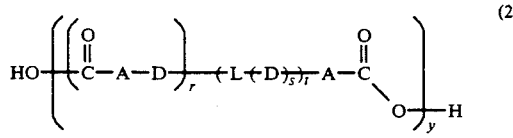

wherein

A is selected from the group consisting of cis-1,4-cyclohexylenedicarboxylate; cis-1,3-cyclohexylenedicarboxylate; trans-1,4-cyclohexylenedicarboxylate; 1,2-phenylenedi-carboxylate; 1,3-phenylenedicarboxylate; 1,4-phenylenedicarboxylate; trimethylenedicarboxylate; tetramethylenedicarboxylate; pentamethylenedicarboxylate; and hexamethylenedicarboxylate acid;

D is selected from residues of the group consisting of 2,2-dimethyl-1,3-propanediol; 2-methyl-1,3-propanediol; 1,2-propanediol; 1,3-propanediol; 1,6-hexanediol; 2,2,4,4-tetramethyl-1,3-cyclobutanediol; 1,4-cyclohexanedimethanol; 2,2,4-trimethyl-1,3-pentanediol; nd 2,2-dimethyl-3-hydroxypropyl-2,2-dimethyl-3-hydroxypropionate;

L is the residue of a branch-inducing poly(carboxyl group)-containing reactant;

r has an average value of about 1 to about 6;

s is equal to one less than the number of hydroxy groups present on reactant (P) and is greater than or equal to 2;

t has an average value of about 0 to 3; and the number average molecular weight of the residue of Formula (2) is about 300 to about 3000 which defines y; and u is about 1 to 6;

K is the residue of a mesogenic diol or its acyl ester selected from the group consisting of residues of hydroquinone; hydroquinone diacetate; toluhydroquinone; mono-chlorohydroquinone; mono-tert-butylhydroquinone; mono-chlorohydroquinone dipropionate; phenylhydroquinone; or a mixture thereof;

G is the residue of a mesogenic diacid selected from the group consisting of residues of trans-1,4-cyclohexanedicarboxylic acid; terephthalic acid; methylterephthalic acid; phenylterephthalic acid; 2,6-naphthalenedicarboxylic acid; or mixtures thereof;

v is about 1 to 6;

w is about 0 to 4; and

V is the residue of a mesogenic monomer containing one hydroxyl group or its acyl ester selected from the group consisting of residues of p-hydroxybenzoic acid; p-acetoxybenzoic acid; methyl p-hydroxybenzoate; 2-hydroxy-4-carboxynaphthalene; 2-hydroxy-6-carbomethoxynaphthalene; or mixtures thereof;

wherein the ratio of the total moles of polyester monomeric residues in said curable polyester to the total equivalents of free hydroxyl groups in said curable polyester is about 1.04 to about 1.50.

2. The curable polyester of claim 1, wherein u is about 1 to about 3 and v is about 1 to about 4.

3. A thermosetting coating composition which comprises (A) about 15 to about 45 weight percent, based on the weight of the total composition, of a curable polyester comprising repeating units of residue of Formula (3);

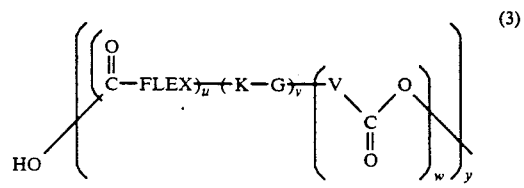

wherein

FLEX is the residue of an oligomer of Formula (1) or (2):

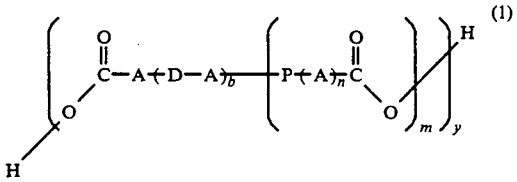

wherein

A is the residue of a dicarboxylic acid selected from the group consisting of cis-1,4-cyclohexylenedicarboxylate; cis-1,3-cyclohexylenedicarboxylate; trans-1,4-cyclohexylenedicarboxylate; 1,2-phenylenedicarboxylate; 1,3-phenylenedicarboxylate; 1,4-phenylenedicarboxylate; trimethylenedicarboxylate; tetramethylenedicarboxylate; pentamethylenedicarboxylate; and hexa-methylenedicarboxylate;

D is the residue of a diol selected from the group consisting of residues of 2,2-dimethyl-1,3-propanediol; 2-methyl-1,3-propanediol; 1,2-propanediol; 1,3-propanediol; 1,6-hexanediol; 2,2,4,4-tetramethyl-1,3-cyclobutanediol; 1,4-cyclohexanedimethanol; 2,2,4-trimethyl-1,3-pentanediol; and 2,2-dimethyl-3-hydroxypropyl-2,2-dimethyl-3-hydroxypropionate;

P is the residue of a branch-inducing poly(hydroxyl group)-containing reactant;

b is 1 to about 6;

m is equal to one less than the number of hydroxyl groups present on reactant P and is greater than 1;

n is 0 to 3;

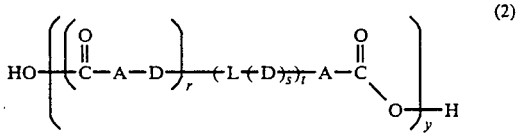

wherein

A is the residue of a dicarboxylic acid selected from the group consisting of cis-1,4-cyclohexylenedicarboxylate; cis-1,3-cyclohexylenedicarboxylate; trans-1,4-cyclohexylenedicarboxylate; 1,2-phenylenedicarboxylate; 1,3-phenylenedicarboxylate; 1,4-phenylenedicarboxylate; trimethylenedicarboxylate; tetramethylenedicarboxylate; pentamethylenedicarboxylate; and hexamethylenedicarboxylate;

D is the residue of a diol selected from the group consisting of residues of 2,2-dimethyl-1,3-propanediol; 2-methyl-1,3-propanediol; 1,2-propanediol; 1,3-propanediol; 1,6-hexanediol; 2,2,4,4-tetramethyl-1,3-cyclobutanediol; 1,4-cyclohexanedimethanol; 2,2,4-trimethyl-1,3-pentanediol; and 2,2-dimethyl-3-hydroxypropyl-2,2-dimethyl-3-hydroxypropionate;

L is the residue of a branch-inducing poly(carboxyl group)-containing reactant;

r has an average value of about 1 to about 6;

s is equal to one less than the number of hydroxy groups present on reactant (P) and is greater than 1;

t has an average value of about 0 to 3; and wherein the number average molecular weight of the residue of Formula (2) is about 300 to about 3000 which defines y; and u is about 1 to 6;

K is the residue of a mesogenic diol or its acyl ester selected from the group consisting of residues of hydroquinone; hydroquinone diacetate; toluhydroquinone; mono-chlorohydroquinone; mono-tert-butylhydroquinone; mono-chlorohydroquinone dipropionate; phenylhydroquinone; or a mixture thereof;

G is the residue of a mesogenic diacid selected from the group consisting of residues of trans-1,4-cyclohexanedicarboxylic acid; terephthalic acid; methylterephthalic acid; phenylterephthalic acid; 2,6-naphthalenedicarboxylic acid; or mixtures thereof;

v is about 1 to 6; and

V is the residue of a mesogenic monomer containing one hydroxyl group or its acyl ester selected from the group consisting of residues of p-hydroxybenzoic acid; p-acetoxybenzoic acid; methyl p-hydroxybenzoate; 2-hydroxy-4-carboxynaphthalene; 2-hydroxy-6-carbomethoxynaphthalene; or mixtures thereof;

w is about 0 to 4; and wherein the ratio of the total moles of polyester monomeric residues in said curable polyester to the total equivalents of free hydroxyl groups in said curable polyester is about 1.04 to about 1.50;

(B) about 0 to about 85 weight percent, based on the weight of the total composition, of a solvent; and (C) about 1 to about 40 weight percent, based on the weight of (A), of a cross-linking agent.

4. The composition of claim 3 wherein the cross-linking agent is a compound having a plurality of groups of the formula —N(CH$_2$OR)$_2$ groups, wherein R is C$_1$–C$_4$ alkyl.

5. The composition of claim 3 wherein the cross-linking agent is selected from hexamethoxymethylamine, tetramethoxymethylbenzoguanamine, and tetramethoxymethylurea.

6. The composition of claim 3 wherein the cross-linking agent is a blocked polyisocyanate compound.

7. The composition of claim 3, wherein the cross-linking compound is an epoxy-functional resin.

8. The composition of claim 3, further comprising one or more leveling, rheology, and flow control agents; crosslinking catalysts; flatting agents; coalescing agents; pigment wetting and dispersing agents and surfactants; ultraviolet absorbers; UV light stabilizers; tinting pigments; defoaming and antifoaming agents; anti-settling, anti-sag and bodying agents; thickeners; anti-skinning agents; anti-flooding and anti-floating agents; fungicides and mildewicides; corrosion inhibitors; thickening agents; or coalescing agents.

9. The composition of claim 3, further comprising one or more leveling, rheology, and flow control agents; crosslinking catalysts; flatting agents; coalescing agents; pigment wetting and dispersing agents and surfactants; ultraviolet absorbers; UV light stabilizers; tinting pigments; defoaming and antifoaming agents; anti-settling, anti-sag and bodying agents; thickeners; anti-skinning agents; anti-flooding and anti-floating agents; fungicides and mildewicides; corrosion inhibitors; thickening agents; or coalescing agents.

10. The composition of claim 3, further comprising one or more pigments.

11. A shaped or formed article coated with the cured composition of claim 3.

12. A thermosetting coating composition which comprises (A) about 25 to about 35 weight percent, based on the weight of the total composition, of a curable polyester comprising repeating units of residue of Formula (3);

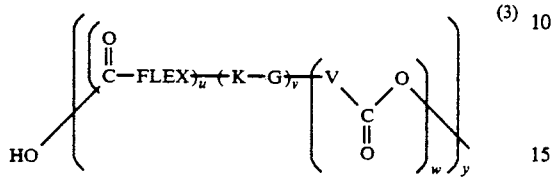

wherein
FLEX is the residue of an oligomer of Formula (1) or (2):

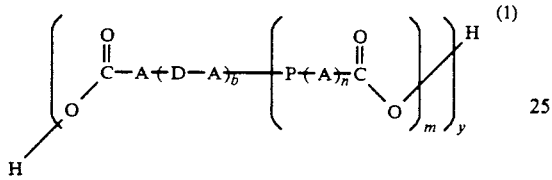

wherein
A is the residue of a dicarboxylic acid selected from the group consisting of cis-1,4-cyclohexylenedicarboxylate; cis-1,3-cyclohexylenedicarboxylate; trans-1,4-cyclohexylenedicarboxylate; 1,2-phenylenedicarboxylate; 1,3-phenylenedicarboxylate; 1,4-phenylenedicarboxylate; trimethylenedicarboxylate; tetramethylenedicarboxylate; penta-methylenedicarboxylate; and hexamethylenedicar-boxylate;

D is the residue of a diol selected from the group consisting of residues of 2,2-dimethyl-1,3-propanediol; 2-methyl-1,3-propanediol; 1,2-propanediol; 1,3-propanediol; 1,6-hexanediol; 2,2,4,4-tetramethyl-1,3-cyclobutanediol; 1,4-cyclohexanedimethanol; 2,2,4-trimethyl-1,3-pentanediol; and 2,2-dimethyl-3-hydroxypropyl-2,2-dimethyl-3-hydroxypropionate;

P is the residue of a branch-inducing poly(hydroxyl group)-containing reactant;
b is 1 to about 6;
m is equal to one less than the number of hydroxyl groups present on reactant P and is greater than 1;
n is 0 to 3;
and wherein the number average molecular weight of the residue of Formula (1) is about 300 to about 3000; or

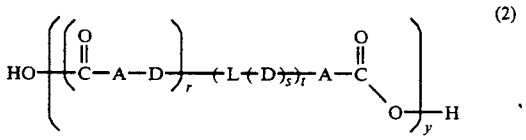

wherein
A is the residue of a dicarboxylic acid selected from the group consisting of cis-1,4-cyclohexylenedicarboxylate; cis-1,3-cyclohexylenedicarboxylate; trans-1,4-cyclohexylenedicarboxylate; 1,2-phenylenedicarboxylate; 1,3-phenylenedicarboxylate; 1,4-phenylenedicarboxylate; trimethylenedicarboxylate; tetramethylenedicarboxylate; penta-methylenedicarboxylate; and hexamethylenedicar-boxylate;

D is the residue of a diol selected from the group consisting of residues of 2,2-dimethyl-1,3-propanediol; 2-methyl-1,3-propanediol; 1,2-propanediol; 1,3-propanediol; 1,6-hexanediol; 2,2,4,4-tetramethyl-1,3-cyclobutanediol; 1,4-cyclohexanedimethanol; 2,2,4-trimethyl-1,3-pentanediol; and 2,2-dimethyl-3-hydroxypropyl-2,2-dimethyl-3-hydroxypropionate;

L is the residue of a branch-inducing poly(carboxyl group)-containing reactant;
r has an average value of about 1 to about 6;
s is equal to one less than the number of hydroxy groups present on reactant (P) and is greater than 1;
t has an average value of about 0 to 3; and
the number average molecular weight of the residue of Formula (2) is about 300 to about 3000; and
u is about 1 to 6;

K is the residue of a mesogenic diol or its acyl ester selected from the group consisting of residues of hydroquinone; hydroquinone diacetate; toluhydroquinone; mono-chlorohydroquinone; mono-tert-butylhydroquinone; mono-chlorohydroquinone dipropionate; phenylhydroquinone; or a mixture thereof;

G is the residue of a mesogenic diacid selected from the group consisting of residues of trans-1,4-cyclohexanedicarboxylic acid; terephthalic acid; methylterephthalic acid; phenylterephthalic acid; 2,6-naphthalenedicarboxylic acid; or mixtures thereof;

v is about 1 to 6; and

V is the residue of a mesogenic monomer containing one hydroxyl group or its acyl ester selected from the group consisting of residues of p-hydroxybenzoic acid; p-acetoxybenzoic acid; methyl p-hydroxybenzoate; 2-hydroxy-4-carboxynaphthalene; 2-hydroxy-6-carbomethoxynaphthalene; or mixtures thereof;

w is about 0 to 4; and wherein the ratio of the total moles of polyester monomeric residues in said curable polyester to the total equivalents of free hydroxyl groups in said curable polyester is about 1.04 to about 1.50;

(B) about 20 to about 35 weight percent, based on the weight of the total composition, of a solvent; and (C) about 25 to about 35 weight percent, based on the weight of (A), of a cross-linking agent.

13. The composition of claim 12, wherein the cross-linking agent is a compound having a plurality of groups of the formula —N(CH₂OR)₂ groups, where R is C₁-C₄ alkyl.

14. The composition of claim 12, wherein the cross-linking agent is selected from hexamethoxymethylamine, tetramethoxymethylbenzoquanamine, and tetramethoxymethylurea.

15. The composition of claim 12, wherein the cross-linking agent is a blocked polyisocyanate compound.

16. The composition of claim 12, wherein the cross-linking agent is an epoxy-functional resin.

17. The composition of claim 12, further comprising one or more pigments.

18. A shaped or formed article coated with the cured composition of claim 12.

* * * * *